United States Patent
Chigira et al.

(10) Patent No.: US 11,756,733 B2
(45) Date of Patent: Sep. 12, 2023

(54) CERAMIC ELECTRONIC DEVICE

(71) Applicant: TAIYO YUDEN CO., LTD., Tokyo (JP)

(72) Inventors: Takumi Chigira, Tokyo (JP); Jun Nishikawa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/120,813

(22) Filed: Dec. 14, 2020

(65) Prior Publication Data
US 2021/0193390 A1   Jun. 24, 2021

(30) Foreign Application Priority Data
Dec. 24, 2019   (JP) .................... 2019-232828

(51) Int. Cl.
*H01G 4/232* (2006.01)
*H01G 4/248* (2006.01)
*H01G 4/30* (2006.01)

(52) U.S. Cl.
CPC ............ *H01G 4/232* (2013.01); *H01G 4/248* (2013.01); *H01G 4/30* (2013.01)

(58) Field of Classification Search
CPC .......... H01G 4/30; H01G 4/232; H01G 4/248; H01G 4/005
USPC ................. 361/321.1, 321.3, 301.4, 306.3
See application file for complete search history.

(56) References Cited

U.S. PATENT DOCUMENTS

| | | | |
|---|---|---|---|
| 10,262,798 B2 * | 4/2019 | Sasaki | H01G 4/30 |
| 2006/0126264 A1 * | 6/2006 | Yoshii | H01G 4/232 361/728 |
| 2008/0297976 A1 * | 12/2008 | Togashi | H01G 4/232 361/306.3 |
| 2013/0050898 A1 | 2/2013 | Seo et al. | 361/321.2 |
| 2016/0093437 A1 * | 3/2016 | Itamura | H01G 4/012 361/301.4 |
| 2016/0211074 A1 * | 7/2016 | Gu | H01G 4/012 |
| 2016/0240314 A1 * | 8/2016 | Fujii | H01G 4/35 |
| 2018/0137982 A1 * | 5/2018 | Sawada | H01G 4/012 |
| 2019/0027312 A1 * | 1/2019 | Muramatsu | H01G 4/12 |
| 2019/0148075 A1 * | 5/2019 | Nakamura | H01G 13/006 361/301.1 |

(Continued)

FOREIGN PATENT DOCUMENTS

| | | | | |
|---|---|---|---|---|
| CN | 206471231 U | * | 9/2017 | H01G 4/012 |
| JP | 2013-48208 A | | 3/2013 | |
| JP | 2019-24077 A | | 2/2019 | |

*Primary Examiner* — Arun Ramaswamy
(74) *Attorney, Agent, or Firm* — Stein IP, LLC

(57) ABSTRACT

A ceramic electronic device includes a multilayer chip having a plurality of dielectric layers and a plurality of internal electrode layers that are stacked, and having a first main face and a second main face, and a plurality of external electrodes, the plurality of external electrodes being spaced from each other, each of the plurality of external electrodes being connected to a part of the plurality of internal electrode layers, the plurality of external electrodes having a predetermined area in the planar view. On at least one of the first main face and the second main face, at least one of the plurality of external electrodes has an extension portion extending along a side of the rectangular shape toward at least one of external electrodes adjacent to the at least one of the plurality of external electrodes.

20 Claims, 12 Drawing Sheets

(56) References Cited

U.S. PATENT DOCUMENTS

2019/0164884 A1* 5/2019 Kasamatsu ....... H01L 23/49827

* cited by examiner

CERAMIC ELECTRONIC DEVICE

CROSS-REFERENCE TO RELATED APPLICATION

This application is based upon and claims the benefit of priority of the prior Japanese Patent Application No. 2019-232828, filed on Dec. 24, 2019, the entire contents of which are incorporated herein by reference.

FIELD

A certain aspect of the present invention relates to a ceramic electronic device.

BACKGROUND

Recently, electronic devices such as mobile phones are downsized and thinned. Therefore, substrates mounted on the electronic devices are downsized and thinned. And, ceramic electronic devices such as multilayer ceramic capacitors mounted on a substrate is downsized and thinned (for example, see Japanese Patent Application Publication No. 2019-24077).

SUMMARY OF THE INVENTION

However, transverse intensity of the ceramic electronic device having a low height may be degraded because of occurrence of crack.

According to an aspect of the present invention, there is provided a ceramic electronic device including: a multilayer chip having a plurality of dielectric layers and a plurality of internal electrode layers that are stacked, and having a first main face and a second main face that face each other in a stacking direction and have a rectangular shape in a planar view; and a plurality of external electrodes each of which extends from the first main face to the second main face at each of corners of the rectangular shape, the plurality of external electrodes being spaced from each other, each of the plurality of external electrodes being connected to a part of the plurality of internal electrode layers, the plurality of external electrodes having a predetermined area in the planar view, wherein, on at least one of the first main face and the second main face, at least one of the plurality of external electrodes has an extension portion extending along a side of the rectangular shape of the at least one of the first main face and the second main face toward at least one of external electrodes adjacent to the at least one of the plurality of external electrodes.

DETAILED DESCRIPTION

A description will be given of an embodiment with reference to the accompanying drawings.

Figure 1:
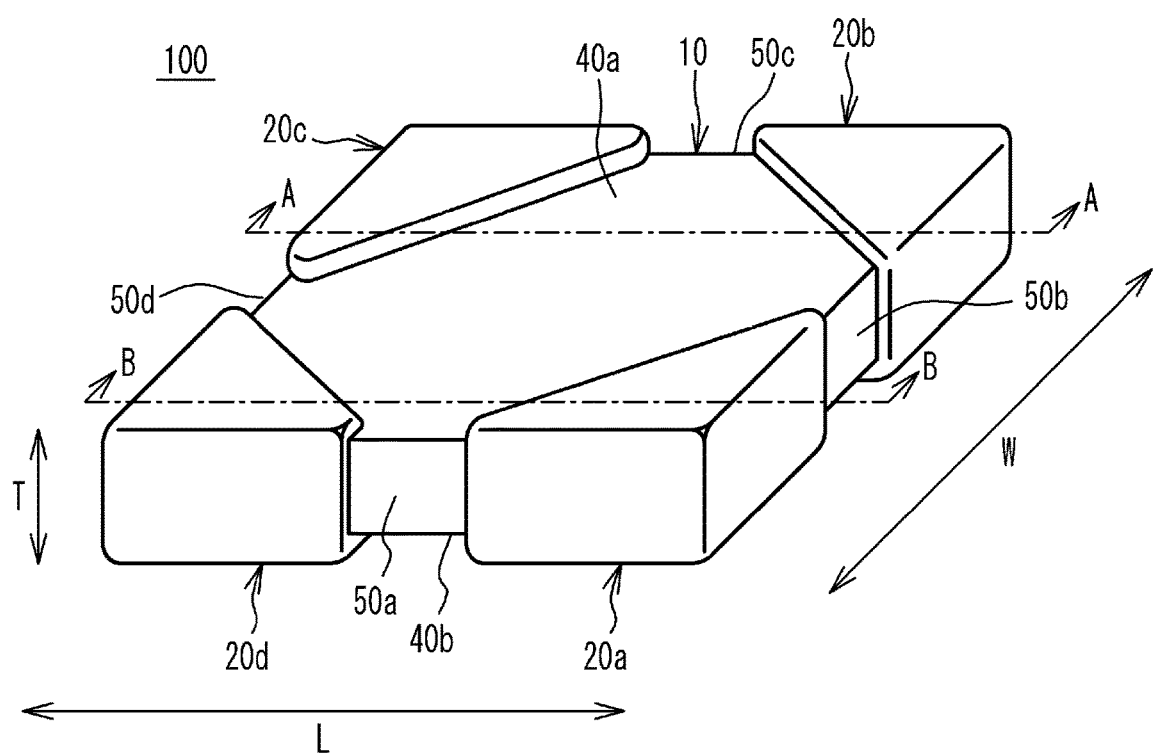
FIG. 1 illustrates an oblique view of a multilayer ceramic capacitor.
Figure 2:
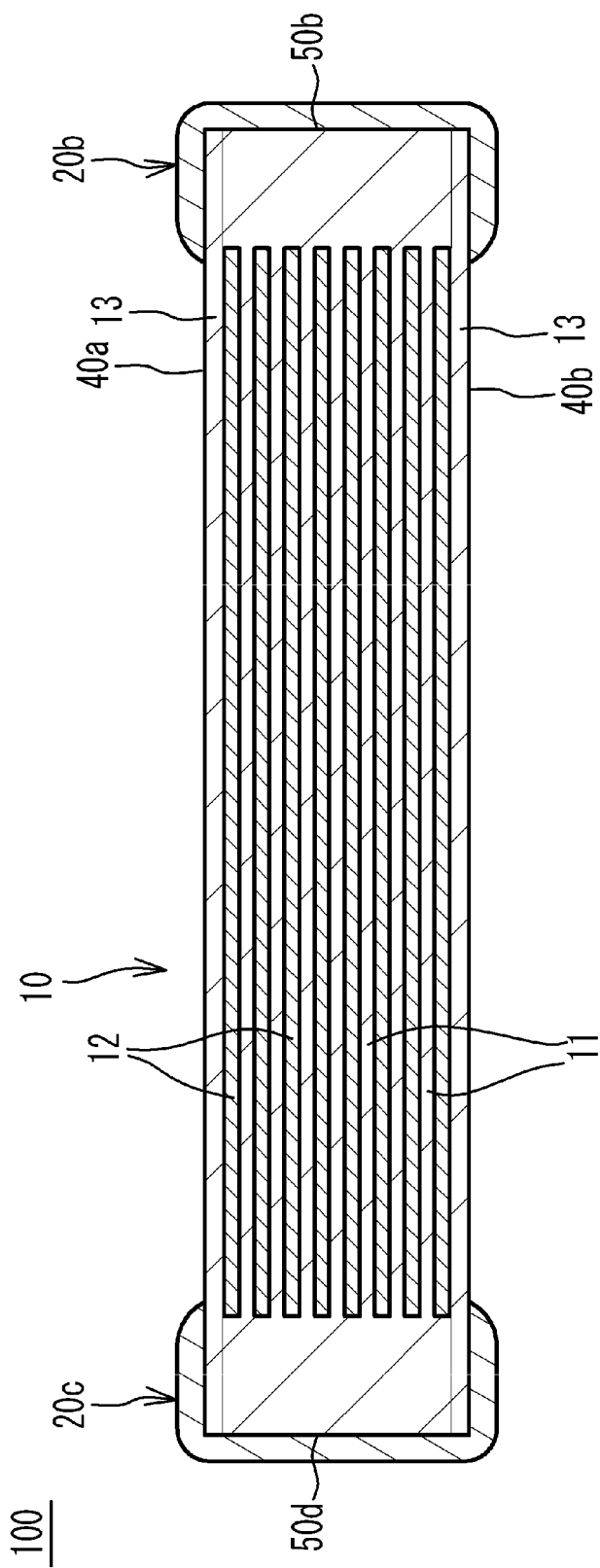
FIG. 2 illustrates a cross sectional view taken along a line A-A of FIG. 1.
Figure 3:
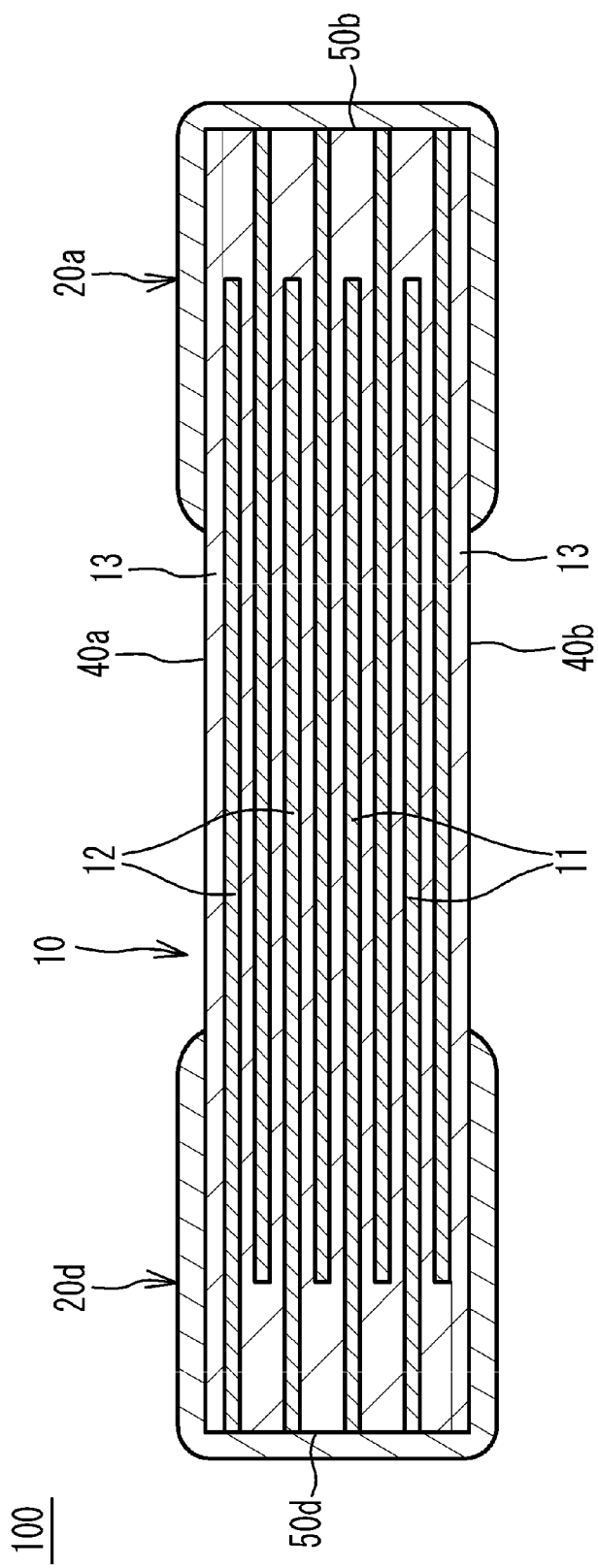
FIG. 3 illustrates a cross sectional view taken along a line B-B of FIG. 1.

(First embodiment) A description will be given of a basic structure of a multilayer ceramic capacitor 100. FIG. 1 illustrates an oblique view of the multilayer ceramic capacitor 100 in accordance with a first embodiment. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 has a multilayer chip 10 having a board shape, and four external electrodes 20a to 20d.

As illustrated in FIG. 2 and FIG. 3, the multiyear chip 10 has a structure in which each of dielectric layers 11 having a ceramic material acting as a dielectric substance and each of internal electrode layers 12 are alternately stacked. In FIG. 3, edges of the internal electrode layers 12 are alternately exposed to the external electrode 20a and the external electrode 20d. Thus, each of the internal electrode layers 12 is alternately electrically connected to each of the external electrode 20a and the external electrode 20d. The internal electrode layer 12 connected to the external electrode 20a is also connected to the external electrode 20c. The internal electrode layer 12 connected to the external electrode 20d is also connected to the external electrode 20b. Therefore, the external electrode 20a and the external electrode 20c have the same pole. The external electrode 20b and the external electrode 20d have the same pole. In a multilayer structure of the dielectric layers 11 and the internal electrode layers 12, outermost layers in the stacking direction are two of the internal electrode layers 12. Cover layers 13 covers an upper face and a lower face of the multilayer structure. A main component of the cover layers 13 is a ceramic material. For example, the main component of the cover layer 13 is the same as that of the ceramic material of the dielectric layers 11.

The multilayer chip 10 has an upper face 40a and a lower face 40b in the stacking direction which are two main faces. The upper face 40a faces the lower face 40b. The multilayer chip 10 has side faces 50a to 50d which are four faces other than the upper face 40a and the lower face 40b. The side face 50a faces the side face 50c. The side face 50b faces the side face 50d.

A length of the multilayer ceramic capacitor 100 in a direction which is vertical to the stacking direction of the dielectric layers 11 and the internal electrode layers 12 and is in parallel with the side faces 50a and 50c is a length L. A width of the multilayer ceramic capacitor 100 in a direction which is vertical to the stacking direction and is in parallel with the side faces 50b and 50d is a width W. A thickness of the multilayer ceramic capacitor 100 is a thickness T. In a planar view of the multilayer ceramic capacitor 100 viewed along the stacking direction, the multilayer chip 10 has a rectangular shape. The length L and the width W correspond to lengths of two sides of the rectangular shape adjacent to each other.

In a planar view which is viewed along the stacking direction, the upper face 40a and the lower face 40b have a rectangular shape. The thickness T of the multilayer ceramic capacitor 100 in the stacking direction is, for example, 150 μm or less, 120 μm or less, 90 μm or less, or 75 μm or less. The thickness of the multilayer chip 10 in the stacking direction is, for example, 90 μm or less, 70 μm or less, or 50 μm or less. The minimum thickness of the multilayer chip 10 in the stacking direction is 30 When the thickness of the multilayer chip 10 is 30 μm or more and 50 μm or less, the multilayer chip 10 has a small size in the thickness direction and has sufficiently large transverse intensity. The length L of the multilayer ceramic capacitor 100 in the stacking direction is, for example, 1.7 mm, 1.2 mm, and 0.6 mm. The width W is, for example, 1.7 mm, 1.2 mm, and 0.6 mm. A ratio of one of the length L and the width W with respect to the thickness T is about 54:46 to 95:5. A ratio L/W is, for example, 0.80 or more and 1.20 or less.

The external electrode 20a extends to the upper face 40a, the lower face 40b and the side faces 50a and 50b, on a corner portion formed by the upper face 40a, the lower face 40b and the side faces 50a and 50b. The external electrode 20b extends to the upper face 40a, the lower face 40b and the side faces 50b and 50c, on a corner portion formed by the upper face 40a, the lower face 40b and the side faces 50b and 50c. The external electrode 20c extends to the upper face 40a, the lower face 40b and the side faces 50c and 50d, on a corner portion formed by the upper face 40a, the lower face 40b and the side faces 50c and 50d. The external electrode 20d extends to the upper face 40a, the lower face 40b and the side faces 50d and 50a, on a corner portion formed by the upper face 40a, the lower face 40b and the side faces 50d and 50a. The external electrodes 20a to 20d are spaced from each other. In the embodiment, the external electrodes 20a to 20d have a predetermined area (for example, a rectangular shape or a square shape) in the planar view viewed along the stacking direction.

Figure 4:
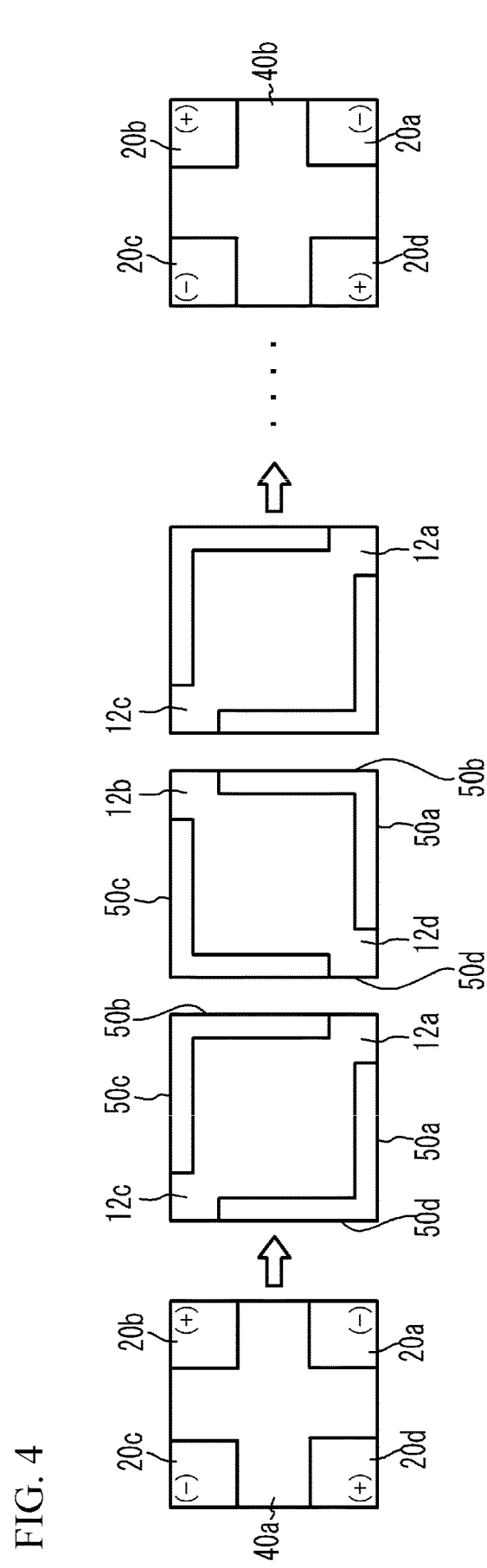
FIG. 4 illustrates a multilayer structure of internal electrode layers.

FIG. 4 illustrates a multilayer structure of the internal electrode layers 12. The leftmost figure of FIG. 4 is a plan view of the upper face 40a and includes the external electrodes 20a to 20d. The rightmost figure of FIG. 4 is a perspective view of the lower face 40b and includes the external electrodes 20a to 20d. Between the leftmost figure and the rightmost figure, each figure from the internal electrode layer 12 on the side of the upper face 40a to the internal electrode layer 12 on the side of the lower face 40b is illustrated, from left to right.

As illustrated in FIG. 4, in the multilayer chip 10, each of first internal electrode layers 12 and each of second internal electrode layers 12 are alternately stacked through each of the dielectric layers 11. The first internal electrode layer 12 has an extraction portion 12a exposed to a corner formed by the side face 50a and the side face 50b and an extraction portion 12c exposed to a corner formed by the side face 50c and the side face 50d. The second internal electrode layer 12 has an extraction portion 12b exposed to a corner formed by the side face 50b and the side face 50c and an extraction portion 12d exposed to a corner formed by the side face 50d and the side face 50a. In the first internal electrode layer 12, only the extraction portion 12a and the extraction portion 12c are exposed to the side faces of the multilayer chip 10. In the second internal electrode layer 12, only the extraction portions 12b and 12d are exposed to the side faces of the multilayer chip 10.

With the structure, the external electrode 20a and the external electrode 20c act as electrodes of a first polarity. The external electrode 20b and the external electrode 20d act as electrodes of a second polarity.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \le x \le 1$, $0 \le y \le 1$, $0 \le z \le 1$) having a perovskite structure.

Figure 5:
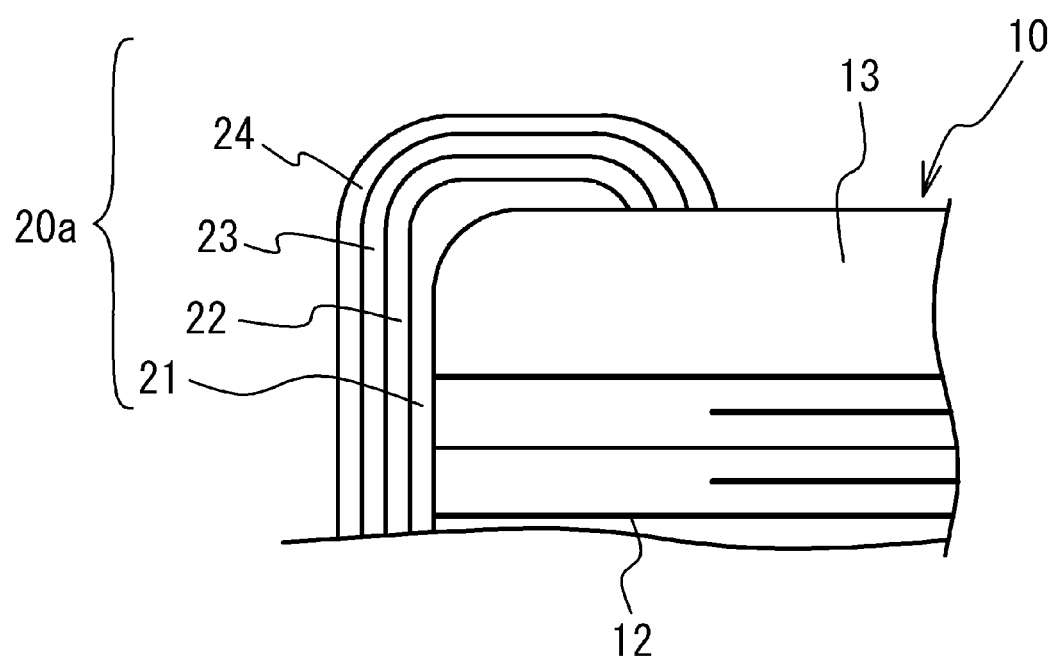
FIG. 5 illustrates a cross sectional view of an external electrode which is a partial cross sectional view taken along a line B-B of FIG. 1.

FIG. 5 illustrates a cross sectional view of the external electrode 20a. FIG. 5 illustrates a partial cross sectional view taken along a line B-B of FIG. 1. In FIG. 5, hatching indicating a cross section is omitted. As illustrated in FIG. 5, the external electrode 20a has a structure in which a plated layer is formed on a base layer. For example, the external electrode 20a has a structure in which a Cu-plated layer 22, a Ni-plated layer 23 and a Sn-plated layer 24 are formed on a base layer 21. Each plated layer is not limited. Another plated layer such as an Au-plated layer may be further provided. The base layer 21 is, for example, a sputtered film of a conductive metal such as Cu, Ti or the like. In FIG. 5, the external electrode 20a is illustrated. The external electrodes 20b to 20d have the same structure as that of the external electrode 20a.

Figure 6:
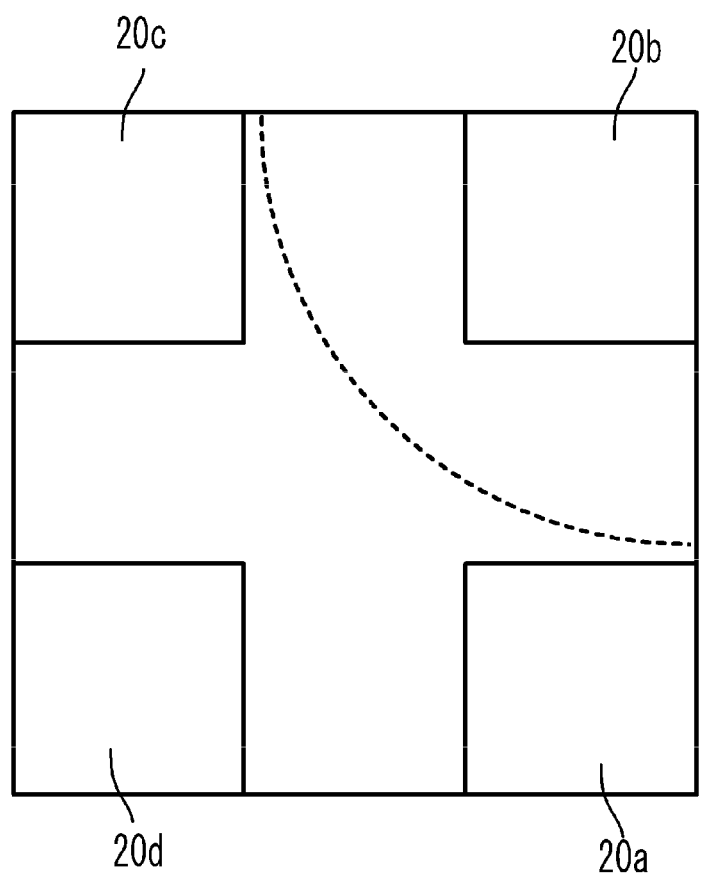
FIG. 6 illustrates crack.

In the multilayer ceramic capacitor having the low-height structure, crack may occur. For example, crack may occur from a position between a first external electrode and a second external electrode adjacent to the first external electrode to a position between the first external electrode and a third external electrode adjacent to the first external electrode. In FIG. 6, in the planar view of the multilayer ceramic capacitor 100 viewed along the stacking direction, crack occurs from the vicinity of the external electrode 20a on a side between the external electrode 20a and the external electrode 20b to the vicinity of the external electrode 20c on a side between the external electrode 20b and the external electrode 20c. When crack occurs, the transverse intensity of the multilayer ceramic capacitor may be degraded. And so, the multilayer ceramic capacitor 100 has a structure for suppressing the occurrence of the crack.

Figure 7A:
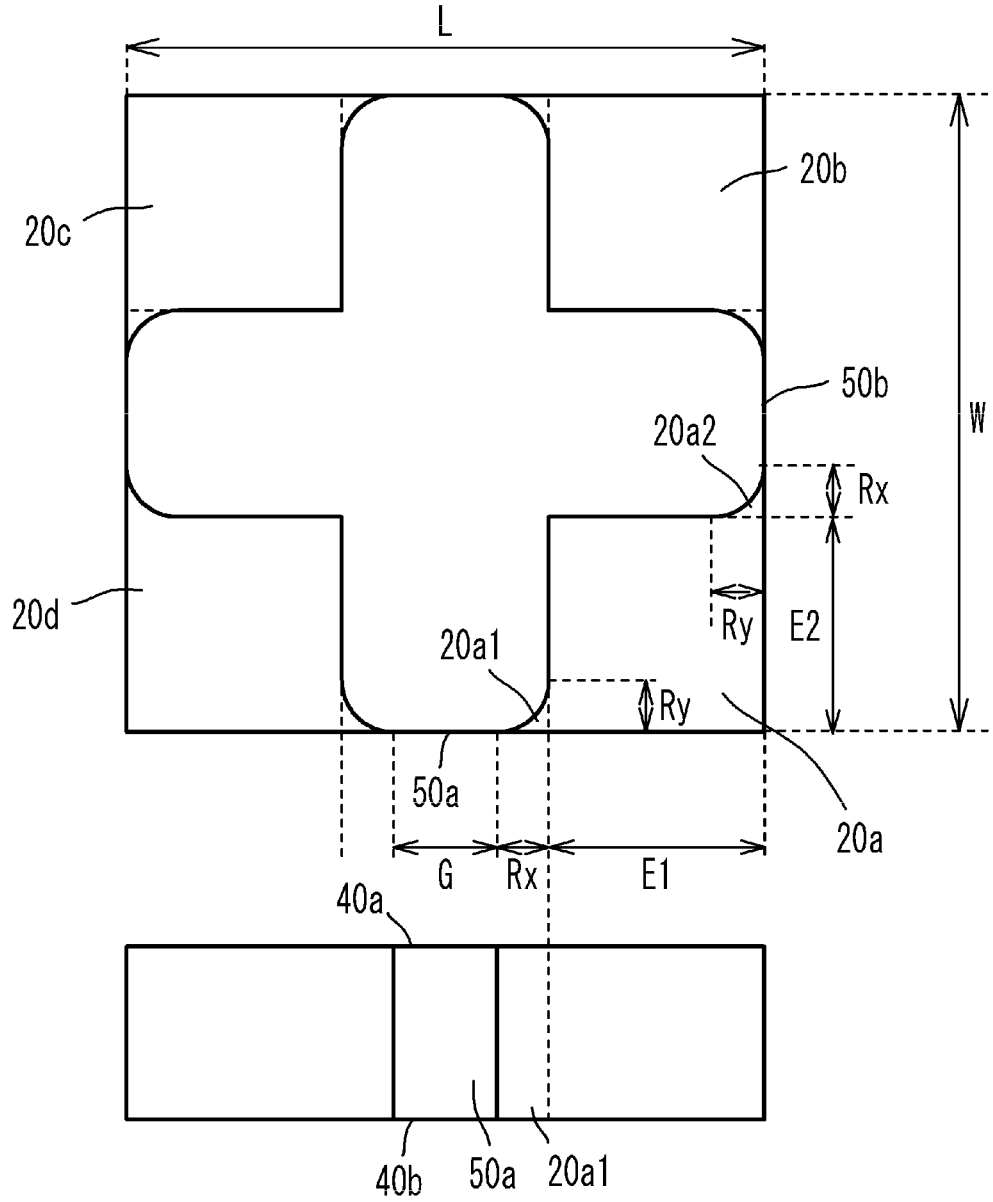
FIG. 7A and FIG. 7B illustrate details of an external electrode.
Figure 7B:
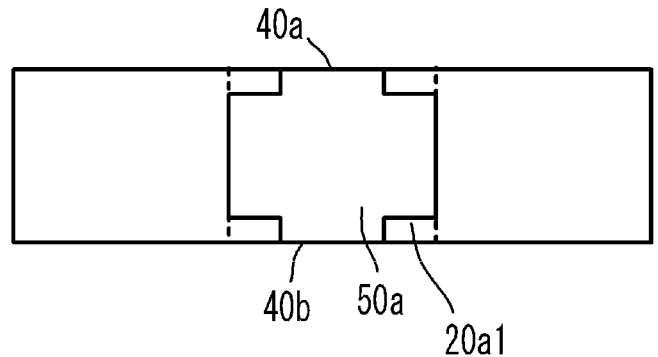

FIG. 7A and FIG. 7B illustrate details of the external electrodes 20a to 20d. An upper figure of FIG. 7A illustrates a plan view of the multilayer ceramic capacitor 100 viewed along the stacking direction. A lower figure of FIG. 7A illustrates a side view of the multilayer ceramic capacitor 100. FIG. 7B illustrates another example of the side view of the multilayer ceramic capacitor 100.

For example, as illustrated in FIG. 7A, the external electrode 20a has a rectangular shape, in a planar view viewed along the stacking direction. In the rectangular shape, a length in a direction of the length L is referred to as E1, and a length in a direction of the width W is referred to as E2.

Moreover, the external electrode 20a has an extension portion 20a1 which extends along a side corresponding to the side face 50a toward the external electrode 20d. The extension portion 20a1 contacts the side corresponding to the side face 50a. Moreover, the external electrode 20a has an extension portion 20a2 which extends along a side corresponding to the side face 50*b* toward the external electrode 20*b*. The extension portion 20*a*2 contacts the side corresponding to the side face 50*b*. That is, the external electrode 20*a* has extension portions extending along sides of a rectangular shape of the multilayer chip 10 toward the external electrodes 20*b* and 20*d* adjacent to the external electrode 20*a*. A length of the extension portion extending along the side is referred to as a length Rx. A length of the extension portion extending toward the side (vertical to the side) is referred to as a length Ry. A distance between the extension portions of the two external electrodes adjacent to each other in the side is referred to as a distance G.

As illustrated in FIG. 7B, in the side face 50*a*, the extension portion 20*a*1 extends to the lower face 40*b*. Similarly, in the side face 50*b*, the extension portion 20*a*2 extends to the lower face 40*b*. That is, the external electrode 20*a* has extension portions extending toward the external electrodes 20*b* and 20*d* adjacent to the external electrode 20*a*, in the side faces of the multilayer chip 10.

As illustrated in FIG. 7B, the extension portion 20*a*1 may be broken on the way between the upper face 40*a* and the lower face 40*b*. Alternatively, the extension portion 20*a*1 may have a narrower width on the way between the upper face 40*a* and the lower face 40*b*. In this case, it is preferable that the extension portion 20*a*1 extends toward the external electrode 20*d* near the upper face 40*a* and the lower face 40*b*, and is broken on the way between the upper face 40*a* and the lower face 40*b*. Alternatively, it is preferable that the extension portion 20*a*1 extends toward the external electrode 20*d* near the upper face 40*a* and the lower face 40*b*, and has a narrower width on the way between the upper face 40*a* and the lower face 40*b*.

The external electrodes 20*b* to 20*d* have the same structure as that of the external electrode 20*a*. That is, each of the external electrodes 20*b* to 20*d* has extension portions extending along sides of a rectangular shape of the multilayer chip 10 toward two external electrodes adjacent to each of the external electrodes 20*b* to 20*d*. The extension portions of the external electrodes 20*b* to 20*d* may extend from the upper face 40*a* to the lower face 40*b*, on the side face of the multilayer chip 10. The extension portions of the case may be broken on the way or may have a narrower width on the way, in the planar view against the side face.

Figure 8A:
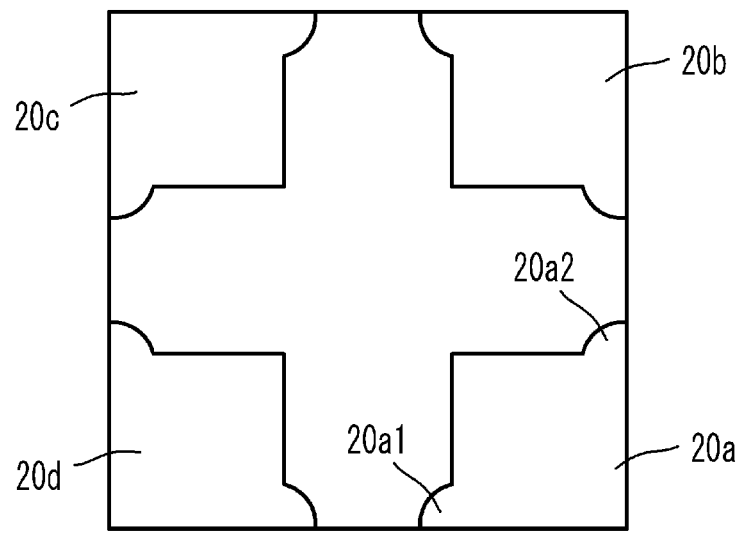
FIG. 8A to FIG. 8C illustrate other examples of an external electrode.
Figure 8B:
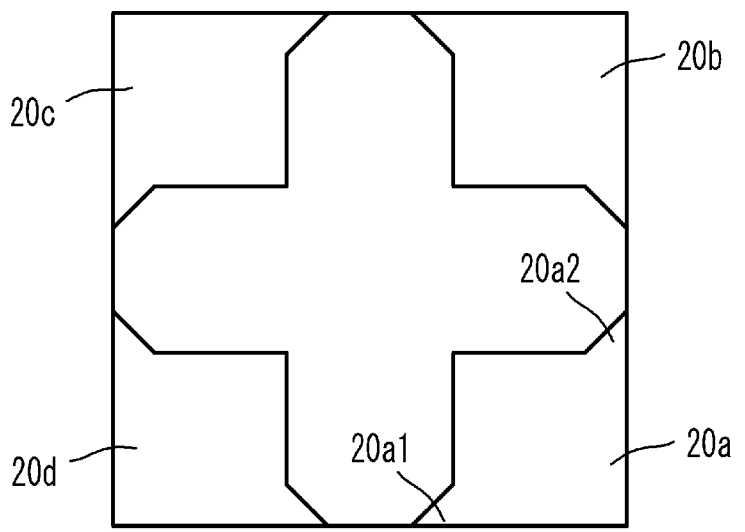
Figure 8C:
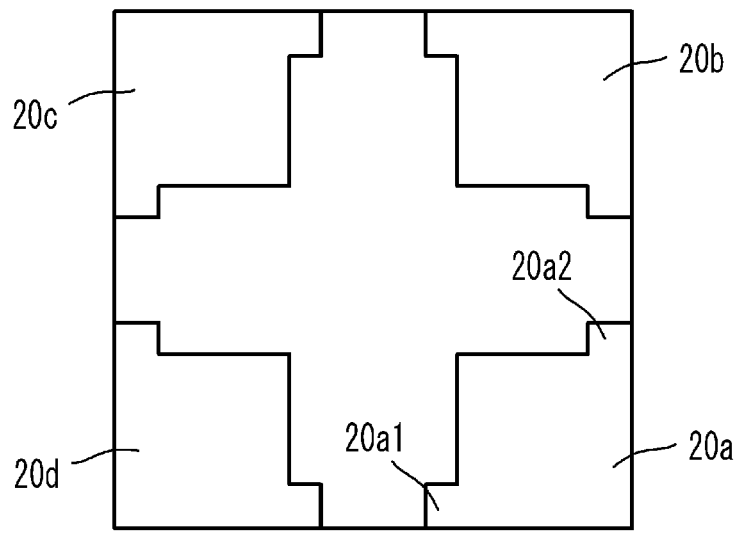

In the planar view of the multilayer ceramic capacitor 100 viewed along the stacking direction, the shape of the extension portion of the external electrode is not limited. As illustrated in FIG. 7A, the extension portion may be recessed toward the side. As illustrated in FIG. 8A, the extension portion may project from the side to an inner side of the planar view of the multilayer ceramic capacitor 100. In FIG. 8A, the extension portion has a fan-shape. Alternatively, as illustrated in FIG. 8B, the extension portion may have a triangle shape without a curvature, in the planar view. Alternatively, as illustrated in FIG. 8C, the extension portion may have a rectangular shape in the planar view of the multilayer ceramic capacitor 100.

In the embodiment, the strength of the multilayer ceramic capacitor 100 is improved because the extension portion extends along the side in the planar view of the multilayer chip from the external electrode, compared to a case where the extension portion is not formed. Therefore, the occurrence of the crack may be suppressed. For example, the extension portion is formed on the pathway of the crack of FIG. 6 and is vertical to the pathway (in the direction of Rx). Therefore, the occurrence of the crack may be suppressed. It is therefore possible to improve the transverse strength of the multilayer ceramic capacitor 100. When the extension portion extends to the side face of the multilayer chip 10, the strength may be further improved.

When the length Rx and the length Ry are small, the extension portion may not necessarily have a sufficiently large length. In this case, it may not necessarily possible to sufficiently suppress the occurrence of the crack. And so, it is preferable that the length Rx and the length Ry have a lower limit. For example, it is preferable that the length Rx is 5 µm or more. It is more preferable that the length Rx is 20 µm or more. It is still more preferable that the length Rx is 70 µm or more. It is preferable that the length Ry is 5 µm or more. It is more preferable that the length Ry is 20 µm or more. It is still more preferable that the length Ry is 70 µm or more. It is possible to measure the length Rx and the length Ry by treating an inflection point of a circumference line of the external electrode toward an adjacent external electrode, as a starting point of the extension portion.

When the length Rx is large, short may occur between the external electrodes because of a solder bridge during mounting the multilayer ceramic capacitor on a substrate. And so, it is preferable that the distance G has a lower limit. For example, it is preferable that the distance G is 50 µm or more. It is more preferable that the distance G is 100 µm or more. It is still more preferable that the distance G is 180 µm or more.

When the extension portions extending from the external electrodes are thin, sufficient strength may not be necessarily achieved. And so, it is preferable that the thickness of the extension portions has a lower limit. For example, it is preferable that the thickness of the extension portion is 2 µm or more. It is more preferable that the thickness is 5 µm or more. It is still more preferable that the thickness is 10 µm or more.

In the embodiment, each of the four external electrodes 20*a* to 20*d* has each of the extension portions. However, the structure is not limited. At least one of the four external electrodes 20*a* to 20*d* has the extension portion. In the embodiment, the two extension portions of the external electrode extend to the two adjacent external electrodes. However, the structure is not limited. At least one of extension portions may extend to one of the two adjacent external electrodes.

Figure 9:
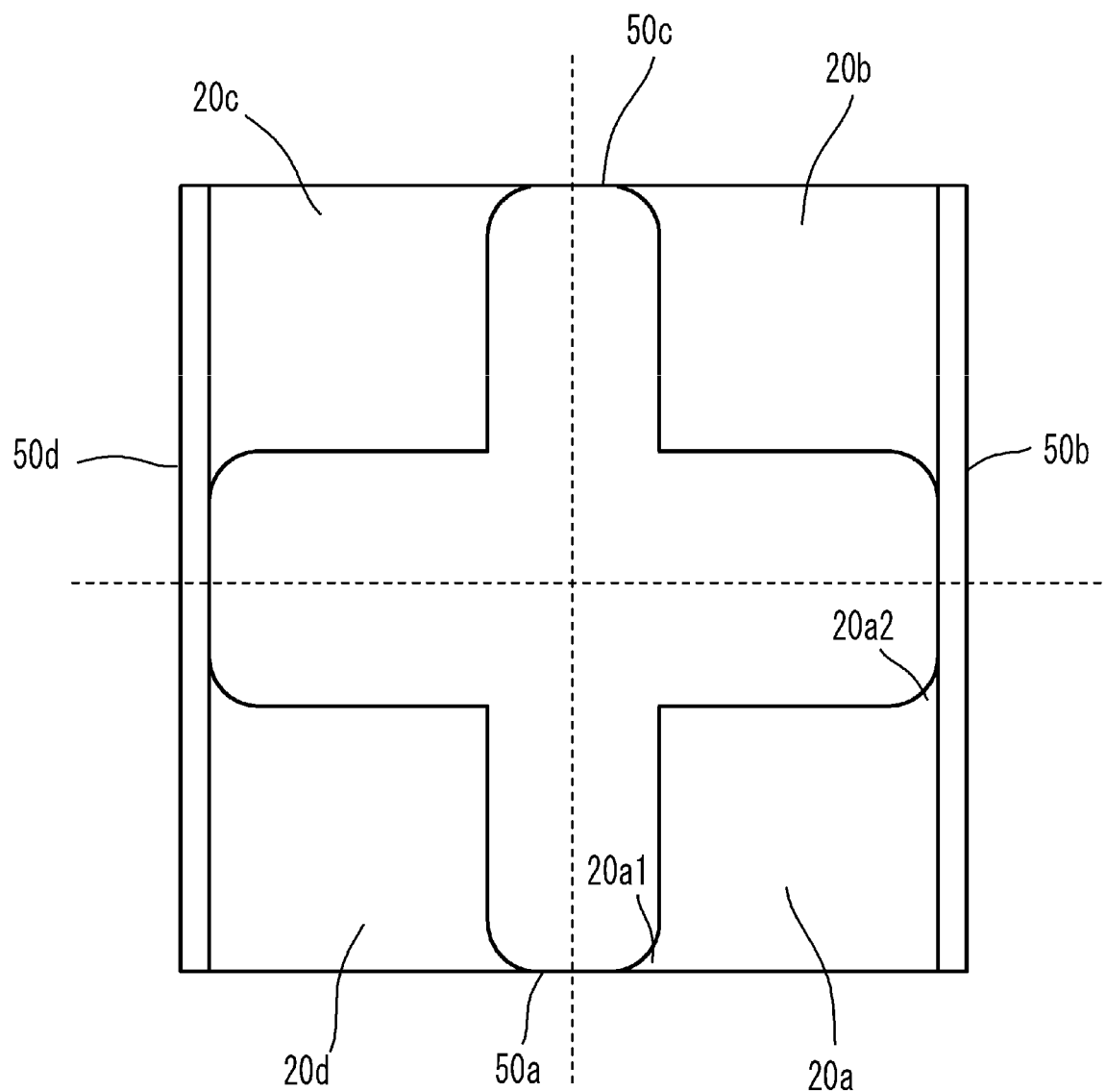
FIG. 9 illustrates another example of an external electrode.
Figure 10A:
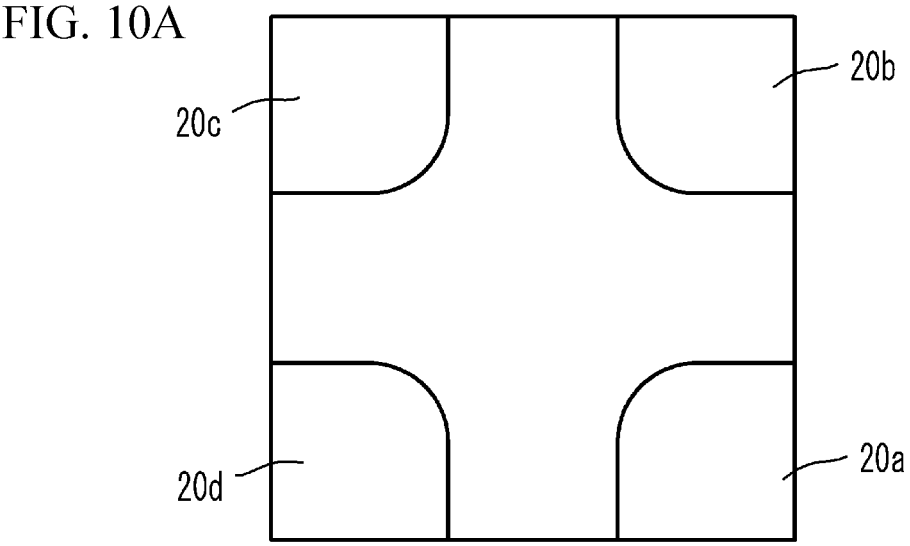
FIG. 10A to FIG. 10C illustrate other examples of an external electrode.
Figure 10B:
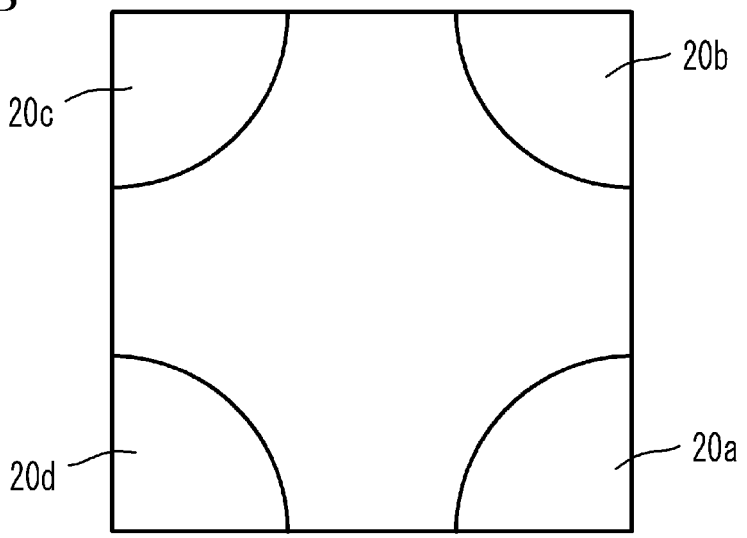
Figure 10C:
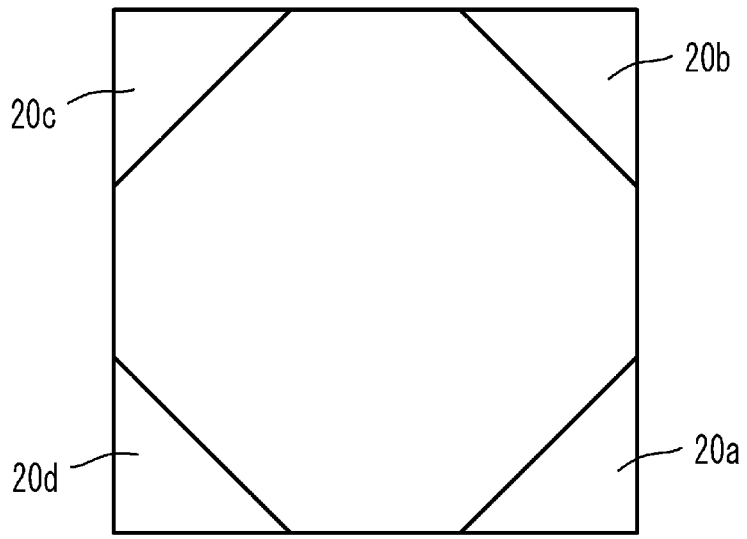

Alternatively, the external electrodes 20*a* to 20*d* may not necessarily extends to two sides of the multilayer chip 10 forming one corner. For example, the external electrode may extend to only one of the two sides forming one corner. In FIG. 9, although the external electrode 20*a* extends to the side corresponding to the side face 50*a*, the external electrode 20*a* does not extend to the side corresponding to the side face 50*b*. That is, in the rectangular shape of the planar view of the multilayer chip 10 viewed along the stacking direction, each of the external electrodes 20*a* to 20*d* is arranged on each of four corners divided by perpendicular bisectors (dotted lines of FIG. 9) of the sides. And, each of the external electrodes 20*a* to 20*d* extends to only one of two sides. And, the internal electrode layer 12 does not extend to the side where the external electrode is not formed. In this case, when the external electrode has the extension portion, the strength of the multilayer ceramic capacitor 100 is improved. It is therefore possible to suppress the occurrence of the crack. In the planar view of the multilayer ceramic capacitor 100, each of the external electrodes 20*a* to 20*d* may have other shapes as illustrated in FIG. 10A to FIG. 10C. In the examples of FIG. 10A to FIG. 10C, the external electrodes 20*a* to 20*d* have the extraction portion described above.

Figure 11:
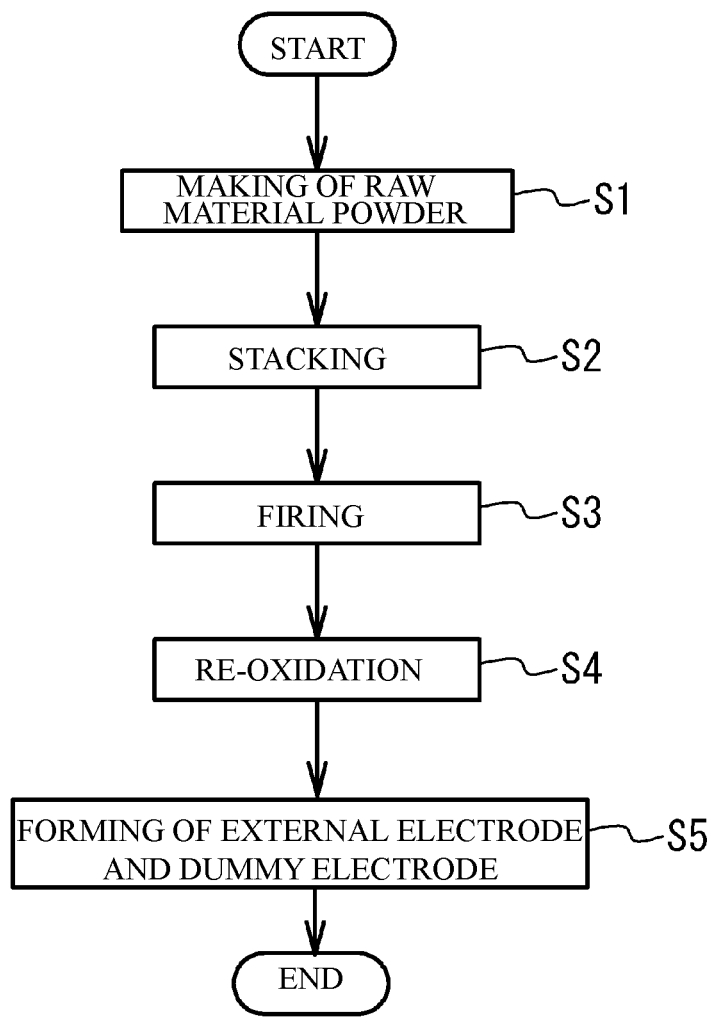
FIG. 11 illustrates a flow of a manufacturing method of a multilayer ceramic capacitor.

Next, a description will be given of a manufacturing method of the multilayer ceramic capacitor 100. FIG. 11 illustrates the flow of the manufacturing methods of the multilayer ceramic capacitor 100.

(Making process of raw material powder) A dielectric material for forming the dielectric layers 11 is prepared. The dielectric material includes a main component ceramic of the dielectric layers 11. Generally, the A site element and the B site element are included in the dielectric layers 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layers 11. For example, a solid-phase method, a sol-gel method, a hydrothermal method or the like can be used. The embodiment may use any of these methods.

Additive compound may be added to the obtained ceramic powder, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium), or an oxide of Co (cobalt), Ni, Li (lithium), B (boron), Na (sodium), K (potassium) and Si (silicon), or glass.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives, are dried and crushed. Thus, ceramic powder is obtained. It is preferable that an average particle diameter of the ceramic powder is 50 nm to 300 nm from a viewpoint of reduction of the thickness of the dielectric layers 11. The grain diameter may be adjusted by crushing the resulting ceramic powder as needed. Alternatively, the grain diameter of the resulting ceramic power may be adjusted by combining the crushing and classifying.

(Stacking process) Next, a binder such as polyvinyl butyral (PVB) resin, an organic solvent such as ethanol or toluene, and a plasticizer are added to the resulting dielectric material and wet-blended. With use of the resulting slurry, a dielectric green sheet is printed on a base material by, for example, a die coater method or a doctor blade method, and then dried.

Next, metal conductive paste for forming an internal electrode is applied to the surface of the dielectric green sheet by screen printing or gravure printing. The metal conductive paste includes an organic binder. Thus, a pattern for forming an internal electrode layer is provided. As co-materials, ceramic particles are added to the metal conductive paste. A main component of the ceramic particles is not limited. However, it is preferable that the main component of the ceramic particles is the same as that of the dielectric layer 11.

Then, the dielectric green sheets are alternately stacked while the base material is peeled. For example, a total number of the staked dielectric green sheets is 100 to 500.

After that, a cover sheet to be the cover layer 13 is cramped on the multilayer structure of the dielectric green sheets. And another cover sheet to be the cover layer 13 is cramped under the multilayer structure. Thus, a ceramic multilayer structure is obtained. After that, the binder is removed from the ceramic multilayer structure in $N_2$ atmosphere of 250 degrees C. to 500 degrees C.

(Firing process) The resulting ceramic multilayer structure is fired for 10 minutes to 2 hours in a reductive atmosphere having an oxygen partial pressure of $10^{-7}$ to $10^{-10}$ atm in a temperature range of 1100 degrees C. to 1300 degrees C. In this manner, each compound is sintered. Thus, the multilayer ceramic capacitor 100 is obtained.

(Re-oxidation process) After that, the re-oxidation process is performed in $N_2$ gas atmosphere in a temperature range of 600 degrees C. to 1000 degrees C.

(Forming process of external electrode) Next, a mask is provided on a region other than the external electrodes 20a to 20d. After that, the base layer 21 is formed by a sputtering method. Another method such as vapor deposition method, a spraying method or the like for forming a thin film may be used. After that, the Cu-plated layer 22, the Ni-plated layer 23 and the Sn-plated layer 24 may be formed on the base layer 21 by plating in this order.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

Examples

The multilayer ceramic capacitors in accordance with the embodiment were made and the property was measured.

(Examples 1 to 15) The multilayer ceramic capacitors 100 were made. The multilayer ceramic capacitors 100 had a 0606 shape (L=0.6 mm, W=0.6 mm). The thickness of the multilayer chip 10 was 70 μm. The thickness T after the plating was 90 μm. E1=E2=200 μm. The shapes of the external electrodes were the shapes of FIG. 7A. In the example 1, the length Rx was 5 to 10 μm, and the length Ry was 5 to 10 μm. In the example 2, the length Rx was 5 to 10 μm, and the length Ry was 20 to 25 μm. In the example 3, the length Rx was 5 to 10 μm, and the length Ry was 70 to 75 μm. In the example 4, the length Rx was 15 to 20 μm, and the length Ry was 5 to 10 μm. In the example 5, the length Rx was 15 to 20 μm, and the length Ry was 20 to 25 μm. In the example 6, the length Rx was 15 to 20 μm, and the length Ry was 70 to 75 μm. In the example 7, the length Rx was 30 to 35 μm, and the length Ry was 5 to 10 μm. In the example 8, the length Rx was 30 to 35 μm, and the length Ry was 20 to 25 μm. In the example 9, the length Rx was 30 to 35 μm, and the length Ry was 70 to 75 μm. In the example 10, the length Rx was 55 to 60 μm, and the length Ry was 5 to 10 μm. In the example 11, the length Rx was 55 to 60 μm, and the length Ry was 20 to 25 μm. In the example 12, the length Rx was 55 to 60 μm, and the length Ry was 70 to 75 μm. In the example 13, the length Rx was 70 to 75 μm, and the length Ry was 5 to 10 μm. In the example 14, the length Rx was 70 to 75 μm, and the length Ry was 20 to 25 μm. In the example 15, the length Rx was 70 to 75 μm, and the length Ry was 70 to 75 μm. The conditions other than the length Rx and the length Ry were common among the examples 1 to 15.

(Comparative example) In the comparative example, Rx=Ry=0. That is, in the comparative example, the external electrodes did not have any extension portions. Other conditions were the same as those of the example 1.

With respect to each of the examples 1 to 15 and the comparative example, 1000 samples were made. Each of the samples was subjected to the transverse intensity test. With respect to each of the samples, it was confirmed whether crack occurred or not after the transverse intensity test. With respect to the examples 1 to 15 and the comparative example, a ratio of the samples determined that the crack occurred with respect to the 1000 samples was measured as a crack occurrence rate.

Figure 12:
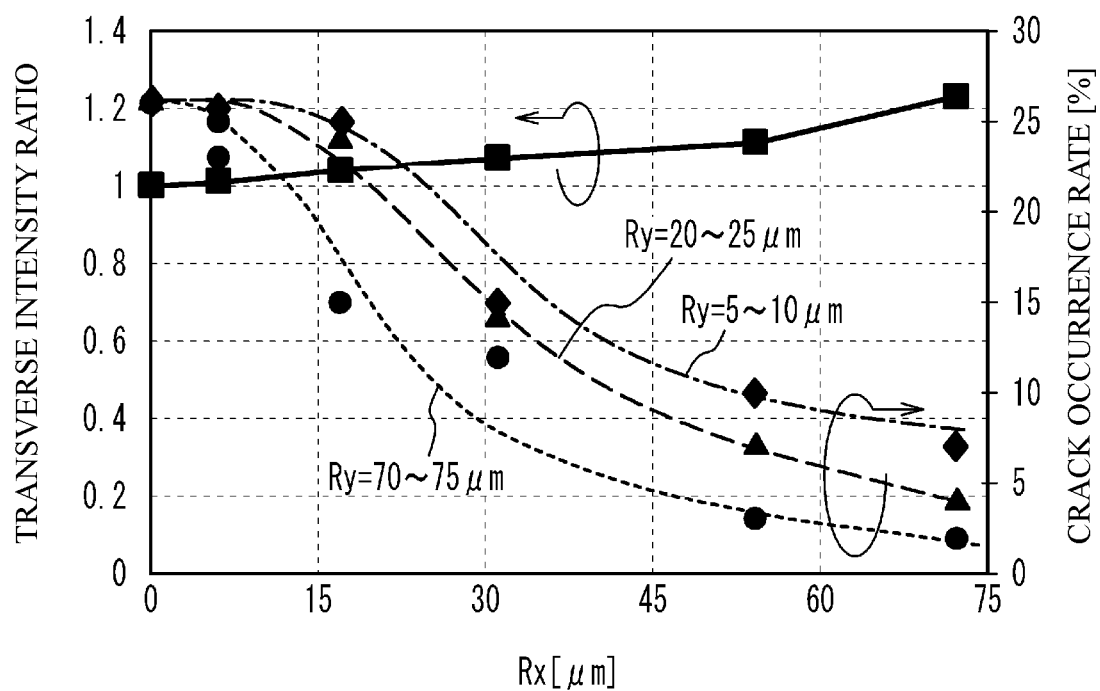
FIG. 12 illustrates a crack occurrence rate and transverse intensity ratio.

The transverse intensity was measured with respect to each of the examples 1 to 15 and the comparative example. FIG. 12 illustrates the crack occurrence rate and the transverse intensity ratio. In FIG. 12, the horizontal axis indicates the length Rx. The left vertical axis indicates the transverse intensity ratio (a ratio on a presumption that the transverse intensity of the comparative example was 1). The right vertical axis indicates the crack occurrence rate. The transverse intensity ratio of the length Rx was calculated from the average value of three different Ry values.

As illustrated in FIG. 12, the crack occurrence rates of the examples 1 to 15 were smaller than that of the comparative example. It is thought that this was because the extension portion was formed from the external electrode, and the strength was improved. When the length Rx and the length Ry got larger, the crack occurrence rates got smaller. It is thought that this was because when the length Rx and the length Ry were large, the extension portion was also large and the strength was improved. And, when the crack occurrence rate got smaller, the transverse intensity got larger.

Although the embodiments of the present invention have been described in detail, it is to be understood that the various change, substitutions, and alterations could be made hereto without departing from the spirit and scope of the invention.

What is claimed is:

1. A ceramic electronic device comprising:
   a multilayer chip having a plurality of dielectric layers and a plurality of internal electrode layers that are stacked, and having a first main face and a second main face that face each other in a stacking direction and have a rectangular shape in a planar view; and
   four external electrodes each of which extends from the first main face to the second main face respectively at each of four corners of the rectangular shape, the four external electrodes being spaced from each other, each of the four external electrodes being connected to a part of the plurality of internal electrode layers, the plurality of external electrodes having a predetermined area in the planar view,
   wherein, on at least one of the first main face and the second main face, in the planar view, at least one of the four external electrodes has four sides, which are boundary lines between the at least one of the four external electrodes and the multilayer chip and are respectively parallel with four external sides of the multilayer chip, and has an extension portion extending toward at least one of external electrodes adjacent to the at least one of the four external electrodes from a part of one of the four sides which is located on an one of the external sides of the multilayer chip.

2. The ceramic electronic device as claimed in claim 1, wherein the predetermined area has a rectangular shape.

3. The ceramic electronic device as claimed in claim 1, wherein the extension portion extends to a side face of the multilayer chip.

4. The ceramic electronic device as claimed in claim 1, wherein a height of the ceramic electronic device in the stacking direction is 150 µm or less.

5. The ceramic electronic device as claimed in claim 1, wherein a height of the ceramic electronic device in the stacking direction is 75 µm or less.

6. The ceramic electronic device as claimed in claim 1, wherein a length of the extension portion along the side of the predetermined area is 5 µm or more.

7. The ceramic electronic device as claimed in claim 1, wherein a length of the extension portion in a direction vertical to the side of the predetermined area is 5 µm or more, in the planar view of the ceramic electronic device.

8. The ceramic electronic device as claimed in claim 1, wherein a distance between the at least one of the plurality of external electrodes and an external electrode adjacent to the at least one of the plurality of external electrodes is 50 µm or more.

9. The ceramic electronic device as claimed in claim 1, wherein, when two sides of the first main face adjacent to each other are referred to as a first side and a second side, respectively, a ratio of a length of the first side and a length of the second side is 0.80 or more and 1.20 or less.

10. The ceramic electronic device as claimed in claim 1, wherein a height of the multilayer chip in the stacking direction is 30 µm or more and 50 µm or less.

11. The ceramic electronic device as claimed in claim 3, wherein a width of a first portion of the extension portion is smaller than that of a second portion of the extension portion, in the planar view against the side face of the multilayer chip.

12. The ceramic electronic device as claimed in claim 1, wherein a height of the ceramic electronic device in the stacking direction is 120 µm or less.

13. The ceramic electronic device as claimed in claim 1, wherein a height of the ceramic electronic device in the stacking direction is 90 µm or less.

14. The ceramic electronic device as claimed in claim 9, wherein a length of each of the first side and a length of the second side are 1.2 mm or more and 1.7 mm or less.

15. The ceramic electronic device as claimed in claim 1, wherein a length of the extension portion along the side of the predetermined area is 20 µm or more.

16. The ceramic electronic device as claimed in claim 1, wherein a length of the extension portion along the side of the predetermined area is 70 µm or more.

17. The ceramic electronic device as claimed in claim 1, wherein a length of the extension portion in a direction vertical to the side of the predetermined area is 20 µm or more, in the planar view of the ceramic electronic device.

18. The ceramic electronic device as claimed in claim 1, wherein a length of the extension portion in a direction vertical to the side of the predetermined area is 70 µm or more, in the planar view of the ceramic electronic device.

19. The ceramic electronic device as claimed in claim 1, wherein two external electrodes next to each other among the four external electrodes are not electrically connected to each other.

20. The ceramic electronic device as claimed in claim 1, wherein two external electrodes which are not next to each other but face each other among the four external electrodes are electrically connected to each other via a part of the plurality of internal electrode layers.

* * * * *